United States Patent
Zeffer et al.

(10) Patent No.: US 7,373,461 B2
(45) Date of Patent: May 13, 2008

(54) SPECULATIVE DIRECTORY LOOKUP FOR SHARING CLASSIFICATION

(75) Inventors: Håkan E. Zeffer, Uppsala (SE); Erik E. Hagersten, Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 215 days.

(21) Appl. No.: 11/413,244

(22) Filed: Apr. 28, 2006

(65) Prior Publication Data

US 2007/0255908 A1 Nov. 1, 2007

(51) Int. Cl.
*G06F 12/00* (2006.01)
(52) U.S. Cl. ........................ 711/141; 711/144
(58) Field of Classification Search ............... None
See application file for complete search history.

(56) References Cited

U.S. PATENT DOCUMENTS

| | | | |
|---|---|---|---|
| 5,619,676 A | 4/1997 | Fukuda et al. | |
| 6,442,597 B1 * | 8/2002 | Deshpande et al. | 709/214 |
| 6,467,012 B1 * | 10/2002 | Alvarez et al. | 710/316 |
| 6,587,930 B1 * | 7/2003 | Deshpande et al. | 711/144 |
| 6,591,348 B1 * | 7/2003 | Deshpande et al. | 711/141 |
| 6,629,210 B1 | 9/2003 | Arimilli et al. | |
| 6,711,651 B1 | 3/2004 | Moreno et al. | |
| 6,839,648 B1 | 1/2005 | Burlison | |
| 6,973,547 B2 | 12/2005 | Nilsson et al. | |
| 7,174,430 B1 * | 2/2007 | O'Krafka et al. | 711/141 |

2002/0161976 A1 10/2002 Ito et al.

OTHER PUBLICATIONS

Zeffer, et al., "Adaptive Coherence Batching for Trap-Based Memory Architectures," May 2005, 11 pages.
Koppelman, "Neighborhood Prefetching on Multiprocessors Using Instruction History," Proceedings of PACT, 2000, ref. 19, 10 pages.
Koppelman, "Neighborhood Prefetching on Multiprocessors Using Instruction History," Proceedings of PACT, 2000, ref. 19 longer version, 14 pages.
Mukherjee, et al., "Using Prediction to Accelerate Coherence Protocols," Proceedings of the 25th Annual International Symposium on Computer Architecture (ISCA), 1998, 12 pages.

(Continued)

*Primary Examiner*—Kevin Verbrugge
(74) *Attorney, Agent, or Firm*—Lawrence J. Merkel; Meyertons, Hood, Kivlin, Kowert & Goetzel, P.C.

(57) ABSTRACT

In one embodiment, a node for a multi-node computer system comprises a coherence directory configured to store coherence states for coherence units in a local memory of the node and a coherence controller configured to receive a coherence request for a requested coherence unit. The requested coherence unit is included in a memory region that includes at least two coherence units, and the coherence controller is configured to read coherence states corresponding to two or more coherence units from the coherence directory responsive to the coherence request. The two or more coherence units are included in a previously-accessed memory region, and the coherence controller is configured to provide the requested coherence unit with a predicted coherence state responsive to the coherence states in the previously accessed memory region.

20 Claims, 5 Drawing Sheets

OTHER PUBLICATIONS

"Memory Sharing Predictor: The Key to a Speculative Coherent DSM", Lai, et al, *Computer Architecture News*, Association for Computing Machinery, New York, vol. 27, No. 2, May 1999, pp. 172-183.

"Selective, Accurate, and Timely Self-Invalidation Using Last-Touch Prediction", Lai, et al, *Computer Architecture News*, Association for Computing Machinery, New York, vol. 28, No. 2, May 2000, pp. 139-148.

"Alternative Implementations of Two-Level Adaptive Branch Prediction", Yeh, et al, *Annual ACM Workshop on Computational Learning Theory*, Aug. 27, 1992, pp. 124-134.

Abdel-Shafi, et al, "An Evaluation of Fine-Grain Producer-Initiated Communication in Cache-Coherent Multiprocessors", Proceedings of the 3rd IEEE Symposium on High-Performance Computer Architecture (HPCA '97), San Antonio, TX, Feb. 1997.

Cox, et al, "Adaptive Cache Coherency for Detecting Migratory Shared Data", In *Proc. of the 20th Annual Int'l Symp. on Computer Architecture (ISCA'93)*, pp. 98-108, May 1993.

Grahn, et al, "Evaluation of a Competitive-Update Cache Coherence Protocol with Migratory Data Detection", *Journal of Parallel and Distributed Computing*, 39(2):168-180, Dec. 1996.

Hill, et al, "Cooperative Shared Memory: Software and Hardware for Scalable Multiprocessors", *IEEE Trans. on Computer Systems*, 11(4): 300-318, Nov. 1993.

Kaxiras, "Identification and Optimization of Sharing Patterns for Scalable Shared-Memory Multiprocessors" , PhD Thesis, University of Wisconsin-Madison, 1998.

Kaxiras, et al, "Improving CC-NUMA Performance Using Instruction-Based Prediction" , In Procedures of HPCA-5, pp. 161-170, Jan. 1999.

Kaxiras, et al, "Coherence Communication Prediction in Shared-Memory Multiprocessors", *In Proc. of HPCA-5*, pp. 156-157, Jan. 2000.

Koufaty, et al, "Data Forwarding in Scalable Shared-Memory Multiprocessors", *IEEE Trans. on Parallel and Distributed Systems*, 7(12): 1250-1264, Dec. 1996.

Laudon, et al, "The SGI Origin: A CCNUMA Highly Scalable Server", *In Proc. of ISCA-24*, pp. 241-251, 1997.

Lebeck, et al, "Dynamic Self-Invalidation: Reducing Coherence Overhead in Shared Memory Multiprocessors", *In Proc. of ISCA-22*, pp. 48-59, Jun. 1995.

Lenoski, et al, "The Directory-Based Cache Coherence Protocol for the DASH Multiprocessor", *In Proc. of ISCA-17*, pp. 148-159, May 1990.

Magnusson, et al, "SimICS/sun4m: A virtual Workstation", *In Proc. of Usenix Annual Technical Conf.*, Jun. 1998.

Skeppstedt, et al, "Simple Compiler Algorithms to Reduce Ownership Overhead in Cache Coherence Protocols", *In Proc. of ASPLOS-6*, pp. 325-337, 1994.

Stenstrom, et al, "An Adaptive Cache Coherence Protocol Optimized for Migratory Sharing", *In Proc. of ISCA-20*, pp. 109-118, 1993.

Woo, et al, "The SPASH-2 Programs: Characterization and Methodological Considerations", *In Proc. of ISCA-22*, pp. 24-36, Jun. 1995.

\* cited by examiner

SPECULATIVE DIRECTORY LOOKUP FOR SHARING CLASSIFICATION

BACKGROUND

1. Field of the Invention

This invention is related to the field of computer systems and, more particularly, to coherence mechanisms in computer systems.

2. Description of the Related Art

Historically, shared memory multiprocessing systems have implemented hardware coherence mechanisms. The hardware coherence mechanisms ensure that updates (stores) to memory locations by one processor (or one process, which may be executed on different processors at different points in time) are consistently observed by all other processors that read (load) the updated memory locations according to a specified ordering model. Implementing coherence may aid the correct and predictable operation of software in a multiprocessing system. While hardware coherence mechanisms simplify the software that executes on the system, the hardware coherence mechanisms may be complex and expensive to implement (especially in terms of design time). Additionally, if errors in the hardware coherence implementation are found, repairing the errors may be costly (if repaired via hardware modification) or limited (if software workarounds are used).

Other systems have used a purely software approach to the issue of shared memory. Generally, the hardware in such systems makes no attempt to ensure that the data for a given memory access (particularly loads) is the most up to date. Software must ensure that non-updated copies of data are invalidated in various caches if coherent memory access is desired. While software mechanisms are more easily repaired if an error is found and are more flexible if changing the coherence scheme is desired, they typically have much lower performance than hardware mechanisms.

One perspective in which software coherence mechanisms particularly suffer is repeated coherence activity involving the same underlying coherence units. Generally, a coherence unit may be any block of data that is treated as a unit for coherence purposes. In many cases, a coherence unit is the same as a cache line, although coherence units may be less than a cache line in size or larger than a cache line in size in various embodiments. Each time coherence activity is needed, the software must get involved to establish the proper state for the desired access to continue. For example, if a coherence unit is first read, software may provide a read-only (e.g. shared or shareable) copy of the coherence unit. If the coherence unit is then written, additional activity may be needed to provide a writeable copy of the same data.

SUMMARY

In one embodiment, a node for a multi-node computer system comprises a coherence directory configured to store coherence states for coherence units in a local memory of the node and a coherence controller configured to receive a coherence request for a requested coherence unit. The requested coherence unit is included in a memory region that includes at least two coherence units, and the coherence controller is configured to read coherence states corresponding to two or more coherence units from the coherence directory responsive to the coherence request. The two or more coherence units are included in a previously-accessed memory region, and the coherence controller is configured to provide the requested coherence unit with a predicted coherence state responsive to the coherence states in the previously accessed memory region.

In another embodiment, a method comprises receiving a coherence request for a requested coherence unit in a node, wherein the node comprises a coherence directory configured to store coherence states for coherence units in a local memory of the node, and wherein the requested coherence unit is included in a memory region that includes at least two coherence units; reading coherence states corresponding to two or more coherence units from the coherence directory responsive to the coherence request, wherein the two or more coherence units are included in a previously-accessed memory region; and providing the requested coherence unit with a predicted coherence state responsive to the coherence states in the previously accessed memory region.

In an embodiment, a system comprises a plurality of nodes coupled to an interconnect. A first node of the plurality of nodes is configured to generate a coherence request for a requested coherence unit for which a second node of the plurality of nodes is the home node. The second node comprises a local memory and a coherence directory configured to store coherence states for coherence units in the local memory, and wherein the requested coherence unit is included in a memory region that includes at least two coherence units. The second node is configured to read coherence states corresponding to two or more coherence units from the coherence directory responsive to the coherence request, wherein the two or more coherence units are included in a previously-accessed memory region. The second node is configured to provide the requested coherence unit with a predicted coherence state responsive to the coherence states in the previously accessed memory region.

BRIEF DESCRIPTION OF THE DRAWINGS

The following detailed description makes reference to the accompanying drawings, which are now briefly described.

Figure 1:
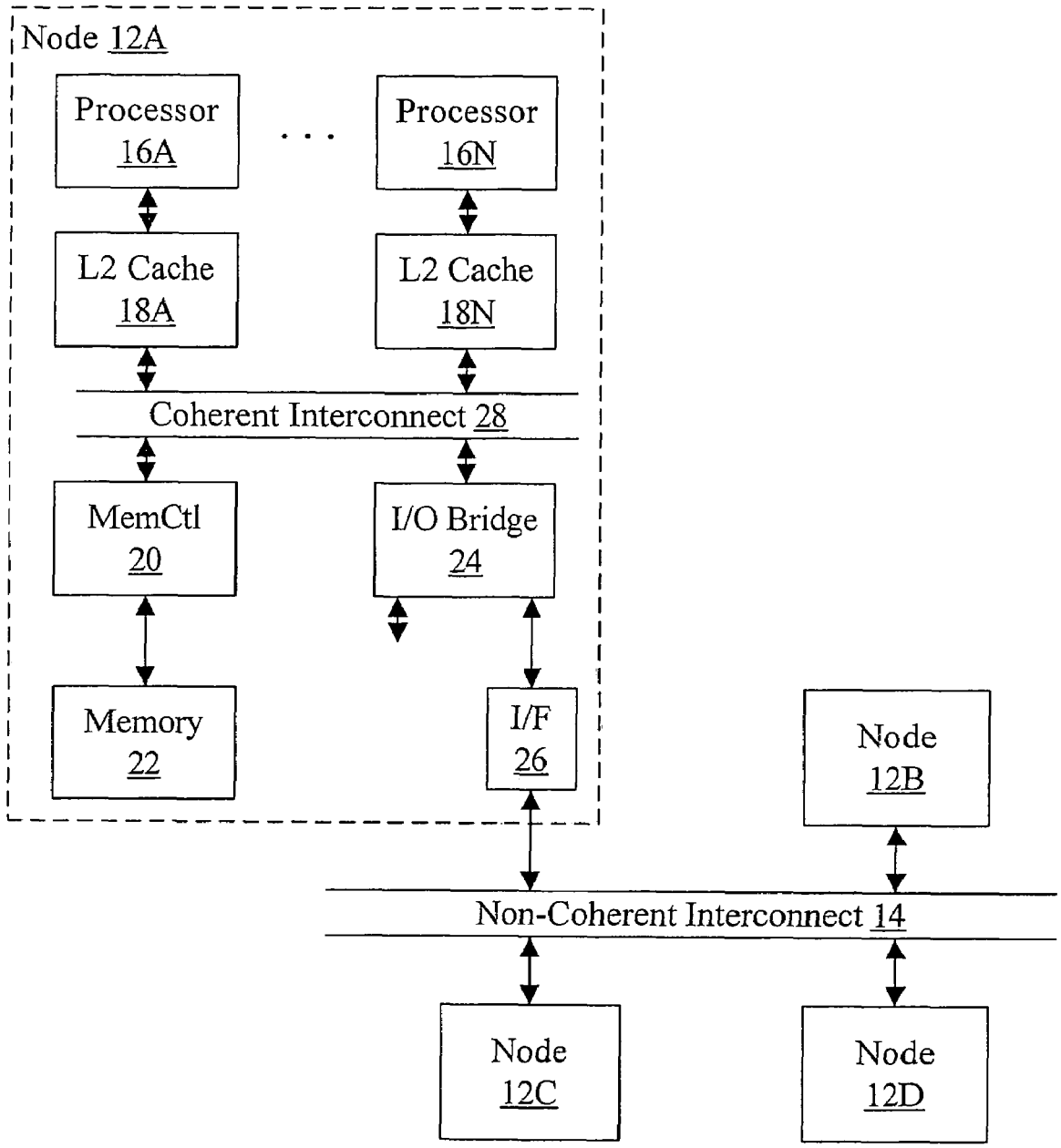
FIG. 1 is a block diagram of one embodiment of a system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Turning now to FIG. 1, a block diagram of one embodiment of a system 10 is shown. In the illustrated embodiment, the system 10 comprises a plurality of nodes 12A-12D coupled to a non-coherent interconnect 14. The node 12A is shown in greater detail for one embodiment, and other nodes 12B-12D may be similar. In the illustrated embodiment, the node 12A includes one or more processors 16A-16N, corresponding L2 caches 18A-18N, a memory controller 20 coupled to a memory 22, and an input/output (I/O) bridge 24 coupled to one or more I/O interfaces including an interface 26 to the interconnect 14. In the illustrated embodiment, the L2 caches 18A-18N are coupled to respective processors 16A-16N and to a coherent interconnect 28. In other embodiments, a given L2 cache may be shared by two or more processors 16A-16N, or a single L2 cache may be shared by all processors 16A-16N. In still other embodiments, the L2 caches 18A-18N may be eliminated and the processors 16A-16N may couple directly to the interconnect 28. The memory controller 20 is coupled to the interconnect 28, and to the memory 22. The interconnect 28, since it is used to communicate among the components within a node, is an intranode interconnect. The interconnect 14 is used to communicate among nodes, and thus is an internode interconnect.

The memory 22 in the node 12A and similar memories in other nodes 12B-12D may form a distributed shared memory for the system 10. In the illustrated embodiment, each node 12A-12D implements hardware-based coherence internally. The distributed shared memory may also be coherent. The coherence of the distributed shared memory may be maintained primarily in software, with certain hardware support. For example, the processors 16A-16N may support a coherence trap for memory operations that require internode coherence activity to maintain coherency in the distributed shared memory. Coherence code may be executed in response to the trap, to ensure that internode coherence is maintained.

Data belonging to another node 12B-12D is referred to as "remote data", a "remote cache line", etc. The address of such data is referred to as the "remote address". Addresses within memory 22 are referred to as local addresses, and the corresponding data is referred to as local data. Note that "remote" and "local" are relative to a given node. A given node is the "home node" for the local data in its memory 22.

Any desired mechanisms may be implemented to detect coherence traps (e.g. signals transmitted with data or other communications to indicate whether or not a coherence trap is to occur, virtual-page based mechanisms, etc.). In one implementation, the hardware support may comprise detecting a designated value in the data accessed by a memory operation executed by a processor 16A-16N, and trapping to the coherence code in response to the detection. The designated value may be used by the software coherence mechanism to indicate that the data is invalid in the node. In many mechanisms, a coherence directory may be maintained by each home node for the local data in that home node. The coherence directory may identify which remote nodes have a copy of the data, the permissions such nodes may have for the data (e.g. read-only, read/write), etc.

Providing some amount of hardware support for internode coherence of the distributed shared memory system may improve performance relative to a software-only coherence mechanism. However, efforts to reduce the number of coherence traps may result in further performance improvements, as traps are generally "expensive" in terms of performance lost to take the traps. Furthermore, predicting a coherence state as described below may reduce the overall coherence traffic, and the latencies associated with the coherence mechanism may be avoided when a correct prediction is made.

In one embodiment, the coherence code may use speculative lookups in the coherence directory in response to coherence requests, in order to predict the coherence state that should be granted to the requesting node. The coherence state may be the requested state, or may be a state that gives the requesting node more permissions than requested, based on the prediction. If the prediction is correct, subsequent coherence traps to upgrade permissions may be avoided.

For example, a coherence trap may be experienced for a read (e.g. resulting from a memory operation). Normally, a read would be granted read-only permission, so that the data could be shared with another node that may read the data (or that may already have a copy of the data). However, if the read is subsequently followed by a write, then upgraded permissions are subsequently requested (via another coherence trap). If the subsequent write is predicted and read-write permissions granted in response to the read coherence request, the upgrade coherence action may be avoided and, in one embodiment, the upgrade coherence trap may be avoided.

In one embodiment, the coherence code may monitor a memory region of a defined size, and may make predictions based on the coherence states in the memory region. Specifically, if a coherence trap occurs for an address in a different memory region than a previous trap, the coherence code may use the coherence states in the previous memory region to predict the coherence state for the current memory region. In some embodiments, neighboring data within the current memory region may also be provided to the requesting node (with a predicted coherence state), attempting to avoid coherence traps for the neighboring data as well.

The memory regions may be fixed or programmable in size. The size of the memory region may generally be based on the aggressiveness desired for the predictions (where a larger memory region is generally more aggressive than a small memory region), and may generally comprise two or more coherence units. For example, a range of 256-1024 bytes may be suitable for the memory region size. If coherence units are 64 bytes, the range corresponds to 4-16 coherence units. Smaller or larger sizes and/or ranges may be used. The regions may be aligned to a region-sized boundary in memory, in one embodiment. In another embodiment, the region may start with the address associated with a coherence request that is outside of the previous memory region, and may extend for the region size. In still another embodiment, the region may terminate with the address that is outside of the previous region and may extend to lower addresses from the address.

As mentioned above, the directory lookup may be speculative. Since the predicted coherence state is a prediction, and thus is not relied one for correctness, the version of the directory state used to make the prediction may not be the most recent version. Thus, for example, updates that are concurrently being made to the directory may not be reflected in the speculative read. Directory entries may be locked (e.g. to perform an update), but the previous state may be speculatively read for the prediction. Furthermore, local copies of remote directory data may be made for speculative read purposes.

A coherence state may generally be any representation of the permissions that a given node has for the corresponding data, and may also indicate whether or not other copies of the data may exist in other nodes. For example, the modified, exclusive, shared, and invalid (MESI) scheme has four states. The MOESI scheme includes the MESI states and an owned state.

As used herein, a memory operation may comprise any read or write of a memory location performed by a processor as part of executing an instruction. A load memory operation (or more briefly, a load) is a read operation that reads data from a memory location. A store memory operation (or more briefly, a store) is a write operation that updates a memory location with new data. The memory operation may be explicit (e.g. a load or store instruction), or may be an implicit part of an instruction that has a memory operand, based on the instruction set architecture (ISA) implemented by the processors 16A-16N.

Generally, a "trap" may refer to a transfer in control flow from an instruction sequence being executed to a designated instruction sequence that is designed to handle a condition detected by the processor 16A-16N. In some cases, trap conditions may be defined in the ISA implemented by the processor. In other cases, or in addition to the ISA-defined conditions, an implementation of the ISA may define trap conditions. Traps may also be referred to as exceptions.

In one embodiment, the processors 16A-16N may implement the SPARC instruction set architecture, and may use the exception trap vector mechanism defined in the SPARC ISA. One of the reserved entries in the trap vector may be used for the coherence trap, and the alternate global registers may be used in the coherence routines to avoid register spill. Other embodiments may implement any ISA and corresponding trap/exception mechanism.

Providing some hardware for coherence in the distributed shared memory may simplify software management of the coherence, in some embodiments. Additionally, in some embodiments, performance may be improved as compared to a software-only coherence implementation.

Each processor 16A-16N may comprise circuitry for executing instructions defined in the instruction set architecture implemented by the processor. Any instruction set architecture may be used. Additionally, any processor microarchitecture may be used, including multithreaded or single threaded, superscalar or scalar, pipelined, superpipelined, in order or out of order, speculative or non-speculative, etc. In one embodiment, each processor 16A-16N may implement one or more level 1 (L1) caches for instructions and data, and thus the caches 18A-18N are level 2 (L2) caches. The processors 16A-16N may be discrete microprocessors, or may be integrated into multi-core chips. The processors 16A-16N may also be integrated with various other components, including the L2 caches 18A-18N, the memory controller 20, the I/O bridge 24, and/or the interface 26.

The L2 caches 18A-18N comprise high speed cache memory for storing instructions/data for low latency access by the processors 16A-16N. The L2 caches 18A-18N are configured to store a plurality of cache lines, which may be the unit of allocation and deallocation of storage space in the cache. The cache line may comprise a contiguous set of bytes from the memory, and may be any size (e.g. 64 bytes, in one embodiment, or larger or smaller such as 32 bytes, 128 bytes, etc.). The L2 caches 18A-18N may have any configuration (direct-mapped, set associative, etc.) and any capacity. Cache lines may also be referred to as cache blocks, in some cases.

The memory controller 20 is configured to interface to the memory 22 and to perform memory reads and writes responsive to the traffic on the interconnect 28. The memory 22 may comprise any semiconductor memory. For example, the memory 22 may comprise random access memory (RAM), such as static RAM (SRAM) or dynamic RAM (DRAM). Particularly, the memory 22 may comprise asynchronous or synchronous DRAM (SDRAM) such as double data rate (DDR or DDR2) SDRAM, RAMBUS DRAM (RDRAM), etc.

The I/O bridge 24 may comprise circuitry to bridge between the interconnect 28 and one or more I/O interconnects. Various industry standard and/or proprietary interconnects may be supported, e.g. peripheral component interconnect (PCI) and various derivatives thereof such as PCI Express, universal serial bus (USB), small computer systems interface (SCSI), integrated drive electronics (IDE) interface, Institute for Electrical and Electronic Engineers (IEEE) 1394 interfaces, Infiniband interfaces, HyperTransport links, network interfaces such as Ethernet, Token Ring, etc. In other embodiments, one or more interface circuits such as the interface 26 may directly couple to the interconnect 28 (i.e. bypassing the I/O bridge 24).

The coherent interconnect 28 comprises any communication medium and corresponding protocol that supports hardware coherence maintenance. The interconnect 28 may comprise, e.g., a snoopy bus interface, a point to point packet interface with probe packets included in the protocol (or other packets used for coherence maintenance), a ring interface, etc. The non-coherent interconnect 14 may not include support for hardware coherency maintenance. For example, in one embodiment, the interconnect 14 may comprise Infiniband. Other embodiments may use any other interconnect (e.g. HyperTransport non-coherent, various I/O or network interfaces mentioned above, etc.). In other embodiments, the interconnect 14 may include support for hardware coherence maintenance, but such support may not be used to maintain coherence over the distributed shared memory system.

The system 10 as a whole may have any configuration. For example, the nodes 12A-12D may be "blades" in a blade server system, stand-alone computers coupled to a network, boards in a server computer system, etc.

It is noted that, while 4 nodes are shown in the system 10 in FIG. 1, other embodiments may include any number of 2 or more nodes, as desired. The number of processors 16A-16N in a given node may vary, and need not be the same number as other nodes in the system.

Figure 2:
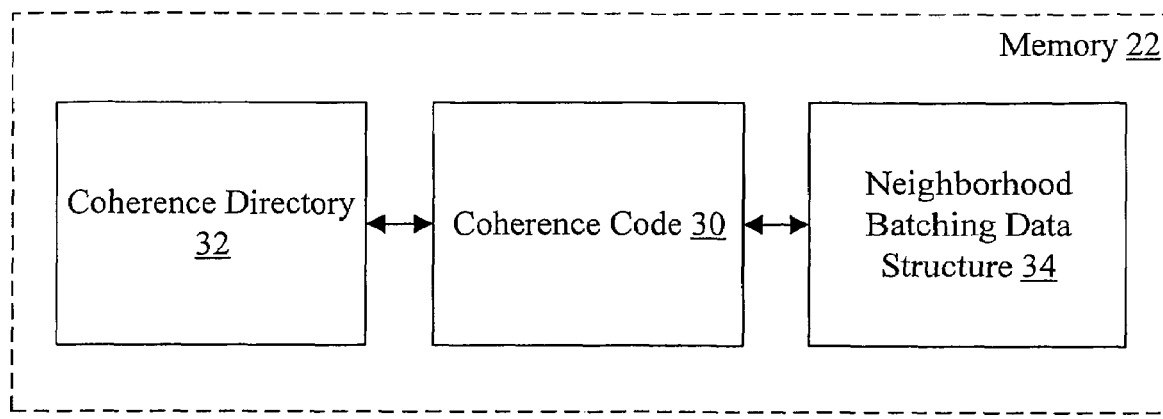
FIG. 2 is a block diagram of one embodiment of a coherence directory, coherence code, and a neighborhood batching data structure stored in a memory.

Turning now to FIG. 2, a block diagram of one embodiment of the memory 22 from the node 12A is shown. Stored in the memory 22 is coherence code 30, a coherence directory 32, and a neighborhood batching data structure 34.

The coherence code 30 is configured to manage coherence traps, and may use the directory 32 and the batching data structure 34 for such activities. The coherence directory 32 may be the coherence directory for those coherence units that are local to the node on which the coherence code 30 is executed. Thus, the coherence code 30 may receive a coherence request from another node (more specifically, from the coherence code executing on the other node) and may use the coherence directory 32 to track the coherence state in other nodes and to determine coherence activity needed to coherently provide a copy of the requested coherence unit to the requesting node. In some cases, for example, shared copies of the data in other nodes may need to be invalidated and/or modified data may need to be fetched from another node.

In some embodiments, the coherence code 30 may replicate some coherence state from other nodes in the coherence directory 32 for predictive purposes. For example, the coherence code 30 may store the directory state for remote data that has been cached in the local node. Such data may not be maintained completely current, except for the local node's activities, but may be suitable for use as a predictor. The data may be refreshed periodically to update for other node's activities. For example, if another node has been granted ownership of the data and the local node has not yet been updated, the directory data not be current. In other embodiments, the coherence directory 32 for the entire system may be replicated in each node (and again, only the local data may be current, and the remainder may be refreshed periodically from the other nodes). In such embodiments, the read of remote data may be speculative since the data may not be updated with the most recent activities at the home node.

Figure 3:
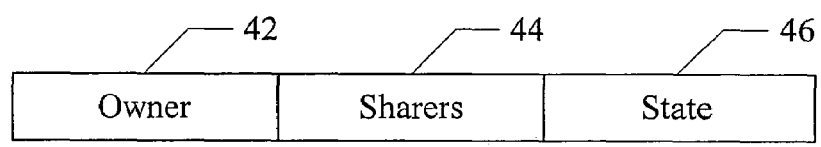
FIG. 3 is a block diagram of one embodiment of a coherence directory entry.

Generally, the coherence directory 32 may comprise a plurality of entries, one entry for each coherence unit tracked in the coherence directory 32. The coherence directory 32 may be indexed by the address of the coherence unit, less the address bits that are an offset within the coherence unit (e.g. the cache line offset bits, if a coherence unit is a cache line). An exemplary directory entry 40 is shown in FIG. 3 for one embodiment. The directory entry 40 includes an owner field 42, a sharers field 44, and a state field 46. The owner field 42 may identify the current owner of the coherence unit, which may be the home node if there is no remote owner. For example, the owner field may store a node number of the owner.

The sharers field 44 may identify one or more sharers of the data, if any. For example, the sharers field 44 may be a bit vector with a bit for each possible node. The bit may be set to indicate that the node is a sharer and clear to indicate that the node is not a sharer. Other embodiments may reverse the set and clear states of the bits. Still other embodiments may use a list of node numbers in the sharers field, or any other indication. The state field 46 may indicate the coherence state of the coherence unit in the owner node, according to the coherence states implemented by the system.

Returning to FIG. 2, the coherence code 30 may also track coherence activity for predictive purposes in the neighborhood batching data structure 34. The neighborhood batching data structure 34 may store data that permits predictions to be made based on the neighborhood around a given coherence request. For example, in one embodiment, the neighborhood batching data structure 34 may be indexed using the program counter (PC) address of the instruction that caused the coherence request (or some portion of the PC). Such a scheme tracks coherence activities caused by a given instruction. Coherence activities in a previous region accessed by the given instruction may have increased likelihood of predicting the coherence activities in a new region.

Figure 4:
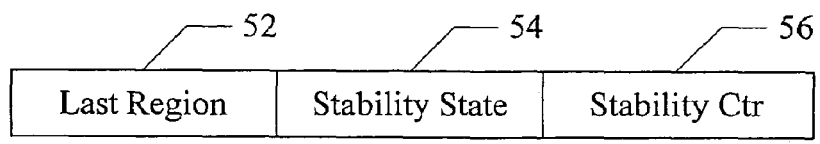
FIG. 4 is a block diagram of one embodiment of a neighborhood batching data structure entry.

The neighborhood batching data structure 34 may comprise a plurality of entries. An exemplary entry 50 is shown in FIG. 4 for one embodiment. In the embodiment of FIG. 4, the entry 50 includes a last region field 52, a stability state field 54, and a stability counter (Ctr) field 56. The last region field 52 may identify the previous memory region in which coherence activity occurred for the PC.

The actual state for each coherence unit in a region may be stored in the coherence directory 32. The coherence code 30 may use the address from the last region field 52 and the size of the region to generate speculative directory lookup reads. The coherence state located in the reads may be used to predict the coherence state for the request.

A stability state 54 may be used to control prediction behavior. For example, a given pattern of coherence state in the previous memory region may be required to be observed a certain number of times before the previous memory region is used to predict coherence state. The coherence state pattern may be observed for complete match, or near complete match, in various embodiments. The stability state 54 and one or more stability counters 56 may be used to track the stability.

Figure 5:
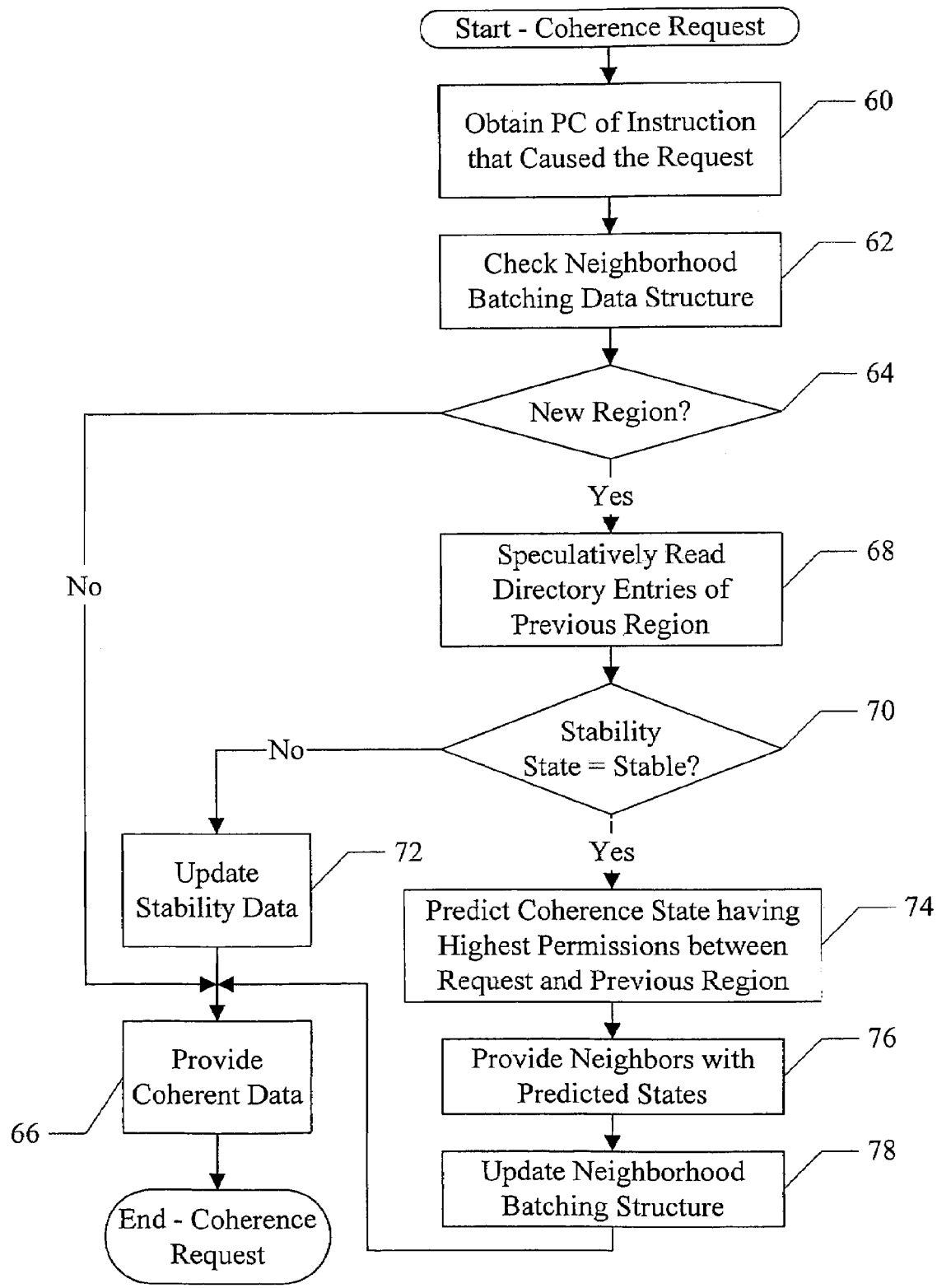
FIG. 5 is a flowchart illustrating operation of one embodiment of a coherency controller in response to a coherence request.

Turning now to FIG. 5, a flowchart is shown illustrating operation of one embodiment of the coherence code 30 in response to a coherence request. The coherence request may be received from another node (generated by the coherence code 30 in that node in response to a coherence trap) or may be generated locally in the node. While blocks are shown in a particular order for ease of understanding, other orders may be used. The coherence code 30 may comprise instructions which, when executed, implement the operation illustrated in FIG. 5.

The coherence code 30 may obtain the PC of the instruction that caused the request (block 60). The PC may be provided in the request, may be obtained from data describing the trap, or may be obtained from other sources. For example, some instruction set architectures store the PC of the instruction causing a trap in a register accessible to software. In other instruction set architectures, a memory data structure may store the PC. In some software conventions, the PC of the instruction causing the trap may be located in a software-managed stack or other data structure, or may be placed in a particular general-purpose register by software convention.

Using the PC, the coherence code 30 may check the neighborhood batching data structure (block 62), reading the indexed entry. If the address of the requested coherence unit is in the same memory region identified in the last region field 52 (decision block 64, "no" leg), then additional prediction may not be needed in this embodiment. The coherence code 30 may provide coherent data in response to the request, including any communications with other nodes as specified by the coherence protocol implemented in the system 10 (block 66). If the address of the requested coherence unit is in a new region (decision block 64, "yes" leg), the coherence code 30 may speculatively read the entries in the coherence directory 30 that correspond to coherence units within the previous memory region (indicated by the last region field 50-block 68).

Using the coherence states from the speculatively-read entries and the stability state 54 from the entry 50 of the neighborhood batching structure 34, the coherence code 30 may determine if a stable coherence pattern has been observed (decision block 70). The stability state may include a representation of the previously observed coherence state. If the coherence pattern in the previous memory region matches the current coherence pattern (within a reasonable accuracy), the stability counter in counter field 56 may be incremented. If the coherence pattern does not match, the coherence counter may be decremented or cleared. The value of the counter may be compared to a stability threshold to determine if the pattern has been observed often enough to be considered stable. For example, a threshold in the range of 1-3 may be used, in some embodiments, although higher thresholds are also possible.

If a stable coherence pattern has not yet been observed (decision block 70, "no" leg), the coherence code 30 may update the stability data in the entry 50 (block 72) and may provide coherent data in response to the request (block 66). On the other hand, if a stable coherence pattern has been observed (decision block 70, "yes" leg), the coherency code 30 may predict the coherence state for the requested coherence unit based on the requested coherence state and the coherence state predicted to be required based on the previous memory region's state or state (block 74). The permissions may include, e.g., read-only or read/write, with read/write being higher than read. For example, if the coherence unit within the previous memory region that corresponds to the requested coherence unit in the current memory region has read/write permission and the requested coherence state provides read-only permission, the predicted coherence state has read/write permission. Similarly, if the permission within the previous memory region is invalid or read-only and the requested coherence state provides read/write permission, the predicted coherence state is the requested coherence state. If the permission within the previous memory region is invalid and the requested coherence state provides read-only permission, the predicted coherence state is again the requested coherence state.

It is noted that, while the above description compares one coherence state from the previous memory region to the requested coherence state, other embodiments may use the average coherency state from the previous memory region for comparison purposes are may use any other mechanism with the requested coherence state and the coherence state(s) from the previous memory region to determine the predicted coherence state.

In some embodiments, the coherence code 30 may also predict that the neighbors of the requested coherence unit within the current memory region will be requested, with coherence states similar to those in the previous memory region. In such embodiments, the coherence code 30 may also predict the coherence states for such neighbors (block 76). The coherence code 30 may update the neighborhood batching data structure entry (block 78). The update may include recording the new memory region and the updated stability state and counter, if applicable. The coherence code 30 may coherently provide the coherence unit(s) to the requesting node (block 66). It is noted that, in embodiments which do not provide predicted coherence states for neighboring coherence units within the new memory region (as illustrated in block 76), subsequent coherence requests within the same memory region may be predicted in the same fashion as the first coherence request within the same memory region (e.g. the path in the flowchart on decision block 64, "no" leg may include predicting the coherence state).

Any software coherence protocol may be used to coherently transfer data to the requesting node. In one example, the coherence code in each node may maintain data structures in memory that identify which coherence units are shared with other nodes, as well as the nodes with which they are shared, which coherence units are modified in another node, etc. The coherence code may lock an entry in the data structure corresponding to the missing coherence unit, perform the transfer (obtaining the most recent copy) and unlock the entry. Other embodiments may use numerous other software mechanisms, including interrupting and non-interrupting mechanisms. It is noted that software may maintain coherence at a coarser or finer grain than a cache line, in various embodiments.

Figure 6:
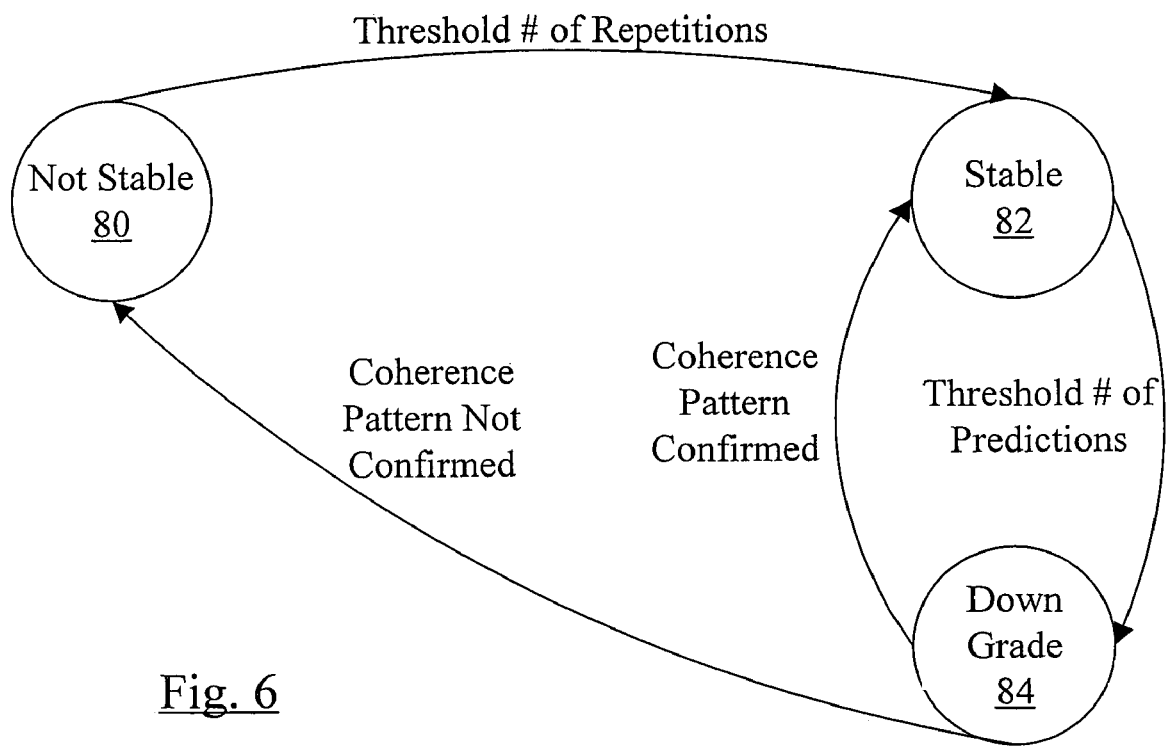
FIG. 6 is state machine diagram illustrating one embodiment of neighborhood batching states.

Turning now to FIG. 6, a state machine diagram illustrating an exemplary state machine for the stability state described above is shown for one embodiment. The state machine generally remains in the same state unless a transition occurs as illustrated in FIG. 6.

In the not stable state 80, either a stable coherence pattern has not yet been detected for the entry, or a previously stable coherence pattern has changed. The not stable state 80 may be the initial state of an entry, and the stability counter may be set to zero. Each time a matching coherence pattern is observed, the stability counter may be incremented until a threshold number of repetitions of the matching pattern have been observed. Once the stability threshold is reached, the state transitions to the stable state 82. In the stable state 82, the previous memory region may be used to predict the coherence state in the new memory region.

The state machine may remain in the stable state 82 until a threshold number of predictions have been made, at which time the state machine may transition to a downgrade state 84. The prediction threshold may differ from the stability threshold, (e.g. there may be separate counters in field 56 of the entry 50). Generally, the prediction threshold may be used to adapt to new coherence patterns if a previous coherence pattern is no longer being observed. In the downgrade state 84, the state machine may reverify that the same coherence state is observed in the next transition from a previous memory region to a new memory region. If the pattern is confirmed, the state machine transitions to the state 82. If the pattern is not confirmed, the entry may be cleared and the state machine may transition to the not stable state 80.

In other embodiments, the coherence pattern may be verified each time the prediction is made in the stable state 82. If the stability counter drops back below the stability threshold, the state machine may transition to the not stable state 80. Other embodiments may implement any other desired stability mechanism.

Figure 7:
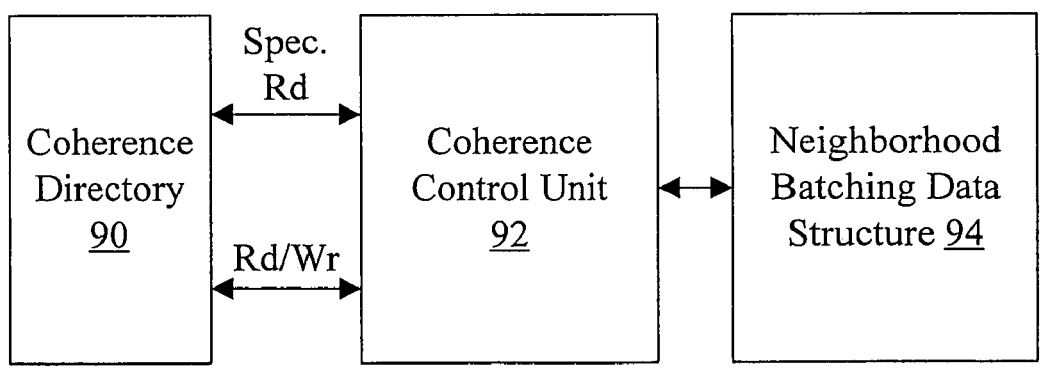
FIG. 7 is a block diagram of one embodiment of a coherence directory and a control unit in hardware.

While the above description focused on a primarily software-managed coherence environment for the distributed shared memory of the system 10, other embodiments may implement some or all of the coherence management in hardware. For example, FIG. 7 illustrates an embodiment in which the coherence directory is in hardware (reference numeral 90) along with a hardware coherence control unit 92 and a neighborhood batching data structure 94 (which may be stored in memory 22 and accessible to the coherence control unit 92 or in private memory coupled to the coherence control unit 92).

The coherence control unit 92 may generally be responsible for managing coherence, similar to the discussion of the coherence code 30. Thus, the coherence control unit 92 may include circuitry to read/write the coherence directory 90 to service coherence requests. Additionally, the coherence control unit 92 may speculatively read directory entries to predict coherence states, as described above. Generally, the coherence control unit 92 may implement the operation described for FIGS. 5 and 6 in hardware.

In one embodiment, the speculative read may be performed using a separate port from the main read/write port used for coherence management. The speculative read may be designed to return the coherence states for each coherence unit in the previous memory region based on one address from the memory region, in one embodiment. Thus, one speculative read may be used to obtain the desired coherence states. In other embodiments, individual speculative read requests may be made for each coherence unit. Similarly, the coherence directory 32 may be arranged in memory to minimize the number of speculative reads used to obtain the desired coherence states. Accordingly, various embodiments may implement a coherence controller, which may comprise any combination of software and/or hardware to implement the coherence operations described herein.

Figure 8:
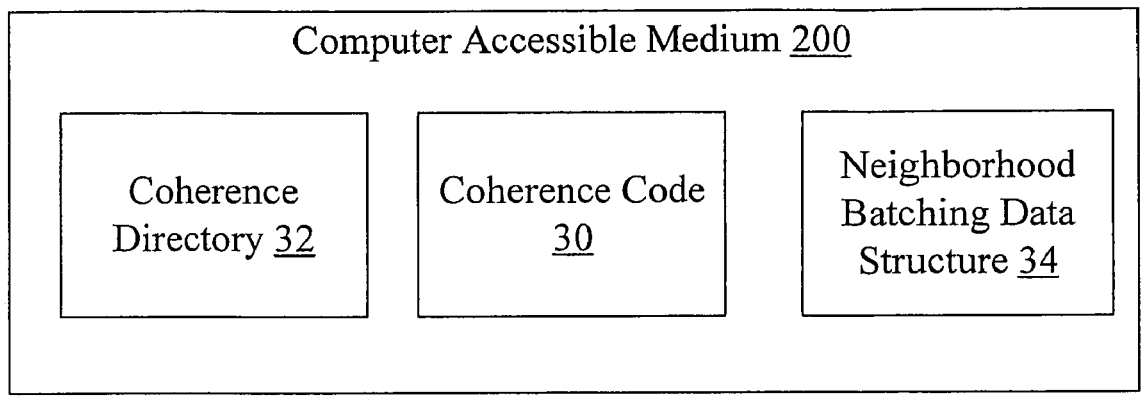
FIG. 8 is a block diagram of one embodiment of a computer accessible medium.

Turning now to FIG. 8, a block diagram of a computer accessible medium 200 is shown. Generally speaking, a computer accessible medium may include any media accessible by a computer during use to provide instructions and/or data to the computer. For example, a computer accessible medium may include storage media. Storage media may include magnetic or optical media, e.g., disk (fixed or removable), tape, CD-ROM, or DVD-ROM, CD-R, CD-RW, DVD-R, DVD-RW. Storage media may also include volatile or non-volatile memory media such as RAM (e.g. synchronous dynamic RAM (SDRAM), Rambus DRAM (RDRAM), static RAM (SRAM), etc.), ROM, or Flash memory. Storage media may include non-volatile memory (e.g. Flash memory) accessible via a peripheral interface such as the Universal Serial Bus (USB) interface in a solid state disk form factor, etc. The computer accessible medium may include microelectromechanical systems (MEMS), as well as media accessible via transmission media or signals such as electrical, electromagnetic, or digital signals, conveyed via a communication medium such as a network and/or a wireless link. The computer accessible medium 200 in FIG. 8 may store one or more of the coherence code 30, the coherence directory 32, and/or the neighborhood batching data structure 34 mentioned above. The coherence code may comprise instructions which, when executed, implement the operation described herein for the coherence code. Generally, the computer accessible medium 200 may store any set of instructions which, when executed, implement a portion or all of the flowchart shown in FIG. 5.

Numerous variations and modifications will become apparent to those skilled in the art once the above disclosure is fully appreciated. It is intended that the following claims be interpreted to embrace all such variations and modifications.

What is claimed is:

1. A node for a multi-node computer system, the node comprising:
   a coherence directory configured to store coherence states for coherence units in a local memory of the node; and
   a coherence controller configured to receive a coherence request for a requested coherence unit, wherein the requested coherence unit is included in a memory region that includes at least two coherence units, and wherein the coherence controller is configured to read coherence states corresponding to two or more coherence units from the coherence directory responsive to the coherence request, wherein the two or more coherence units are included in a previously-accessed memory region, and wherein the coherence controller is configured to provide the requested coherence unit with a predicted coherence state responsive to the coherence states in the previously accessed memory region.

2. The node as recited in claim 1 wherein the coherence controller comprises hardware circuitry configured to access the coherence directory.

3. The node as recited in claim 1 wherein the coherence controller comprises coherence code executable on a processor in the node.

4. The node as recited in claim 1 wherein the coherence controller is configured to predict coherence states for one or more additional coherence units in the memory region, and to provide the additional coherence units in response to the coherence request.

5. The node as recited in claim 1 wherein the predicted coherence state comprises a maximum permission between the coherence request and a coherence state indicated by the previously-accessed memory region.

6. The node as recited in claim 1 wherein the coherence controller is configured to predict the predicted coherence state responsive to a stability corresponding to the previously accessed memory region.

7. The node as recited in claim 6 wherein the stability measure comprises a number of iterations of a coherence state pattern in previously-accessed memory regions.

8. The node as recited in claim 1 wherein the read is speculative.

9. The node as recited in claim 1 wherein the coherence controller is configured to track the previously accessed memory regions responsive to a program counter of an instruction causing the coherence request.

10. A method comprising:
    receiving a coherence request for a requested coherence unit in a node, wherein the node comprises a coherence directory configured to store coherence states for coherence units in a local memory of the node, and wherein the requested coherence unit is included in a memory region that includes at least two coherence units;
    reading coherence states corresponding to two or more coherence units from the coherence directory responsive to the coherence request, wherein the two or more coherence units are included in a previously-accessed memory region; and
    providing the requested coherence unit with a predicted coherence state responsive to the coherence states in the previously accessed memory region.

11. The method as recited in claim 10 further comprising:
    predicting coherence states for one or more additional coherence units in the memory region; and
    providing the additional coherence units in response to the coherence request.

12. The method as recited in claim 10 wherein the predicted coherence state comprises a maximum permission between the coherence request and a coherence state indicated by the previously-accessed memory region.

13. The method as recited in claim 10 further comprising predicting the predicted coherence state responsive to a stability corresponding to the previously accessed memory region.

14. The method as recited in claim 13 wherein the stability measure comprises a number of iterations of a coherence state pattern in previously-accessed memory regions.

15. The method as recited in claim 10 wherein the reading is speculative.

16. The method as recited in claim 10 further comprising tracking the previously accessed memory regions responsive to a program counter of an instruction causing the coherence request.

17. A system comprising a plurality of nodes coupled to an interconnect, wherein a first node of the plurality of nodes is configured to generate a coherence request for a requested coherence unit for which a second node of the plurality of nodes is the home node, and wherein the second node comprises a local memory and a coherence directory configured to store coherence states for coherence units in the local memory, and wherein the requested coherence unit is included in a memory region that includes at least two coherence units, and wherein the second node is configured to read coherence states corresponding to two or more coherence units from the coherence directory responsive to the coherence request, wherein the two or more coherence units are included in a previously-accessed memory region, and wherein the second node is configured to provide the requested coherence unit with a predicted coherence state responsive to the coherence states in the previously accessed memory region.

18. The system as recited in claim 17 wherein second node is configured to predict coherence states for one or more additional coherence units in the memory region, and to provide the additional coherence units in response to the coherence request.

19. The system as recited in claim 17 wherein the second node is configured to predict the predicted coherence state responsive to a stability corresponding to the previously accessed memory region.

20. The system as recited in claim 17 wherein the read is speculative.

* * * * *